United States Patent
Saito et al.

(10) Patent No.: US 6,586,517 B2
(45) Date of Patent: Jul. 1, 2003

(54) LONG FIBER-REINFORCED POLYPROPYLENE RESIN COMPOSITION

(75) Inventors: Koichi Saito, Ichihara (JP); Toshimori Nakai, Ichihara (JP); Takahiro Tochioka, Aki-gun (JP)

(73) Assignees: Mazda Motor Corporation, Hiroshima-ken (JP); Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 0 days.

(21) Appl. No.: 10/073,254

(22) Filed: Feb. 13, 2002

(65) Prior Publication Data

US 2002/0156176 A1 Oct. 24, 2002

(30) Foreign Application Priority Data

Feb. 16, 2001 (JP) ........................................ 2001-039457

(51) Int. Cl.[7] .............................. C08J 3/00; C08K 9/00; C08K 3/40; C08K 3/34; C08L 51/00
(52) U.S. Cl. ...................... 524/494; 523/217; 524/493; 524/502; 524/504; 524/847
(58) Field of Search ................................ 524/494, 502, 524/493, 504, 847; 523/217

(56) References Cited

U.S. PATENT DOCUMENTS 5,514,745 A * 5/1996 Yoshino

FOREIGN PATENT DOCUMENTS

| EP | 0 056 703 | 7/1982 |
|---|---|---|
| EP | 0 652 138 | 5/1995 |
| EP | 1 027 973 | 8/2000 |
| JP | 58-104907 | 6/1983 |
| JP | 8-269124 | 10/1996 |
| WO | 97/19805 | 6/1997 |
| WO | 00/36011 | 6/2000 |

OTHER PUBLICATIONS

Patent Abstracts of Japan, abstract of JP 05–239286 (Sep. 1993).
Macromolecules, vol. 8, No. 5 (1975), pp. 687–689.
JIS K 7210 (Testing Method for Melt Flow Rate of Thermoplastics, 1976).
JIS K 7113 (Testing Method for Tensile Properties of Plastics, 1981).

* cited by examiner

*Primary Examiner*—Patrick D. Niland
(74) *Attorney, Agent, or Firm*—Wenderoth, Lind & Ponack, L.L.P.

(57) ABSTRACT

The present invention provides a long fiber-reinforced polypropylene resin composition for a molded article which is improved in all of a mechanical strength, a rigidity and an impact resistance and excellent as well in a durability, in which the long fiber-reinforced polypropylene resin composition comprises a long fiber-reinforced propylene polymer composition comprising a propylene polymer modified with unsaturated carboxylic acid or an anhydride thereof and having an isotactic pentad ratio of 96% or more and a melt flow rate of 100 to 500 g/10 min, an alkaline earth metal compound, and a glass fiber; and a propylene-ethylene copolymer composition comprising a propylene-ethylene copolymer having a melt flow rate of 10 to 60 g/10 min and a nucleating agent.

7 Claims, No Drawings

LONG FIBER-REINFORCED POLYPROPYLENE RESIN COMPOSITION

FIELD OF THE INVENTION

The present invention relates to a long fiber-reinforced polypropylene resin composition for a molded article which is improved in all of a mechanical strength, a rigidity and an impact resistance as compared with those of conventional ones and which is excellent as well in a durability.

BACKGROUND OF THE INVENTION

A so-called long fiber-reinforced polypropylene resin composition obtained by impregnating a molten polypropylene resin on a continuous fiber bundle for reinforcement and then carrying out a pulltrusion, followed by cutting it to a pellet having a length of 2 to 50 mm provides a molded article which is excellent in a mechanical strength, a rigidity and an impact resistance and therefore is widely used for uses in car parts, industrial parts and the like. However, the existing state is that all of these items are still unsatisfactory depending on uses and desired to be further improved.

A composition obtained by impregnating a modified polyolefin blended with an alkaline earth metal compound on a reinforced fiber bundle and then cutting it to a pellet was filed in International Publication WO99/20446 as international application for patent by the present applicants as a long fiber-reinforced polyolefin resin composition for a molded article which is improved in a mechanical strength and an impact resistance. This composition is satisfactory in a mechanical strength and an Izod impact strength but still unsatisfactory in a punching impact resistance and a durability.

Further, compositions prepared by blending long fiber-reinforced polypropylene polymer pellets with propylene-ethylene block copolymers are proposed as a glass fiber-reinforced polyolefin resin composition which is improved in a mechanical strength and an impact resistance (Japanese Patent Application Laid-Open No. 239286/1993 and Japanese Patent Application Laid-Open No. 173329/1995). These compositions are improved as well in a mechanical strength and an Izod impact strength but still unsatisfactory in a rigidity, a punching impact resistance and a durability.

As described above, a long fiber-reinforced polypropylene resin composition for a molded article which is improved in all of a mechanical strength, a rigidity, an impact resistance and specifically a punching impact resistance to a large extent and which is excellent as well in a durability has not yet been known, and such composition has been desired.

An object of the present invention is to solve the problems described above and to provide a long fiber-reinforced polypropylene resin composition which is more improved in all of a mechanical strength, a rigidity and an impact resistance than those of conventional ones and is excellent as well in a durability and which can suitably be used for wide applications.

SUMMARY OF THE INVENTION

Intensive investigations repeated by the present inventors in order to obtain a long fiber-reinforced polypropylene resin composition which can solve the problems described above. They have resulted in finding that very effective for solving the problems described above is a resin composition obtained by blending a long fiber-reinforced resin comprising as a base and a specific modified propylene polymer compounded with an alkaline earth metal compound with a specific crystalline propylene-ethylene copolymer as a diluent, and thus they have reached the present invention.

That is, the present invention comprises structures shown below.

The present invention relates to a long fiber-reinforced polypropylene resin composition comprising a long fiber-reinforced-propylene polymer composition (A) and a crystalline propylene-ethylene copolymer composition (B), wherein the former accounts for 55 to 90% by weight, and the latter accounts for 10 to 45% by weight.

The long fiber-reinforced propylene polymer composition (A) of the former comprises (A1), (A2) and (A3) shown below, and the blending proportions thereof are 20 to 64.9% by weight, 0.1 to 5% by weight and 35 to 75% by weight respectively;

(A1): a modified propylene polymer obtained by modifying a propylene homopolymer with an unsaturated carboxylic acid or an anhydride thereof, or a mixture of the above modified propylene polymer and an unmodified propylene homopolymer, wherein the isotactic pentad ratio (P value) is 96% or more, and the melt flow rate (230° C., 21.18N; hereinafter abbreviated as [MFR]) is 100 to 500 g/10 min, (A2): at least one selected from the group consisting of simple substances, hydroxides and oxides of alkaline earth metals and (A3): a long glass fiber having a length of 2 to 50 mm.

The crystalline propylene-ethylene copolymer composition (B) of the latter is a composition comprising (B1) and (B2) shown below in which the mixing proportion thereof is 0.001 to 1 part by weight of (B2) per 100 parts by weight of (B1);

(B1): 100 parts by weight of a crystalline propylene-ethylene copolymer having an MFR of 10 to 60 g/10 min comprising a propylene homopolymer part which is a polymer having an isotactic pentad ratio (P value) of 96% or more, a ratio (Q value) of a weight average molecular weight (Mw) to a number average molecular weight (Mn) being 6 or less and a hexane extract content of 0.8% by weight or less, and a propylene-ethylene copolymer part and (B2): 0.01 to 1 part by weight of a nucleating agent.

The preferred embodiment of the present invention is the resin composition described above, wherein the modified propylene polymer or the mixture of the above modified propylene polymer and the unmodified propylene homopolymer (A1) has an MFR of 100 g/10 min or more and less than 300 g/10 min.

Another preferred embodiment of the present invention is the resin composition described above, wherein the propylene homopolymer part (B1) contained in the crystalline propylene-ethylene copolymer has an isotactic pentad ratio (P value) of 97% or more.

More preferred embodiment of the present invention is the resin composition described above, wherein the long fiber-reinforced propylene polymer composition (A) is a pellet produced by a melt-pulltrusion method.

Further preferred embodiment of the present invention is the resin composition described above, wherein the unsaturated carboxylic acid or anhydride thereof is maleic anhydride.

Further preferred embodiment of the present invention is the resin composition described above, wherein at least one selected from the group consisting of simple substances, hydroxides and oxides of alkaline earth metals is magnesium hydroxide.

DETAILED DESCRIPTION OF THE INVENTION

The modified propylene polymer (A1) obtained by modifying a propylene homopolymer with unsaturated carboxylic acid or an anhydride thereof, or the mixture of the above modified propylene polymer and an unmodified propylene homopolymer constituting the long fiber-reinforced propylene polymer composition (A) according to the present invention has to have an isotactic pentad ratio (P value) of 96% or more and an MFR of 100 to 500 g/10 min, preferably 100 g/10 min or more and less than 300 g/10 min in terms of an improving effect for the rigidity, the impact resistance and the durability. Also when (A1) is the mixture of the modified propylene polymer and the unmodified propylene homopolymer, the mixture has to fall in the range described above. However, it is more preferred in terms of an improving effect for the rigidity, the impact resistance and the durability that the unmodified propylene homopolymer is not used and the substantially whole amount of (A1) is the modified propylene polymer.

In this case, the isotactic pentad ratio shows an isotactic ratio in terms of a pentad unit in a molecular chain and can be determined based on the descriptions of Macromolecules 8, 687 (1975) by means of $^{13}$C-NMR.

A production process for the modified propylene homopolymer described above includes a process in which 100 parts by weight of a propylene homopolymer having an isotactic pentad ratio of 96% or more is molten and kneaded with 0.1 to 5 parts by weight of an unsaturated carboxylic acid or a derivative thereof and 0.01 to 0.5 part by weight of an organic peroxide per 100 parts by weight of the above polymer. A blending amount of the organic peroxide has to be suitably controlled so that the MFR falls in the range described above.

A production process for the propylene homopolymer having an isotactic pentad ratio of 96% or more shall not specifically be restricted, and any of publicly known processes can be adopted. A process disclosed in Japanese Patent Application Laid-Open No. 104907/1983 can be given as one example thereof.

The unsaturated carboxylic acid or anhydride thereof described above includes acrylic acid, methacrylic acid, maleic acid, Nadic Acid (brand name: endo-cis-bicyclo-[2,2,1]hepto-5-ene-2,3-dicarboxylic acid), fumaric acid, itaconic acid, maleic anhydride, Nadic Anhydride (brand name: endo-cis-bicyclo-[2,2,1]hepto-5-ene-2,3-dicarboxylic anhydride) and itaconic anhydride, and maleic anhydride is preferred from a viewpoint of a reinforcing effect of a glass fiber.

To be specific, magnesium hydroxide, calcium hydroxide and magnesium oxide are given as the examples of the simple substances, hydroxides and oxides of alkaline earth metals (A2) of described above constituting the long fiber-reinforced polypropylene polymer composition (A) according to the present invention. They can be used alone or in combination of two or more kinds thereof. Magnesium hydroxide is preferably used because it is effective for improving the rigidity and the impact resistance.

A continuous glass fiber bundle is used as a raw material for the long glass fiber (A3) of described above having a length of 2 to 50 mm constituting the long fiber-reinforced polypropylene polymer composition (A) of the present invention, and this is commercially available as glass roving. Usually, it has an average fiber diameter of 4 to 30 μm, a converged filament number of 400 to 10,000 filaments and a tex yarn number count of 300 to 20,000 g/km, and it has preferably an average fiber diameter of 9 to 23 μm and a converged filament number of 1,000 to 6,000. From a viewpoint of a reinforcing effect, it is preferably subjected on a surface thereof to silane treatment for the sake of providing the resin with a surface adhesive property.

The blending proportions of (A1) to (A3) are 20 to 64.9% by weight of (A1), 0.1 to 5% by weight of (A2) and 35 to 75% by weight of (A3).

Any of processes publicly known as a melt-pulltrusion process can be employed as a production process for the long fiber-reinforced propylene polymer composition of (A). Usually, employed is a process in which a molten resin comprising (A1) and (A2) is fed from an extruder into an impregnating bath provided at a tip of the extruder. A continuous glass fiber bundle which is a raw material for (A3) is passed therethrough to impregnate the molten resin on the above glass fiber bundle and then pulled out through a nozzle and cut into a pellet having a length of 2 to 50 mm.

Capable of being used as a method for feeding (A1) and (A2) are;

1) a method in which the modified propylene polymer and the alkaline earth metal compound (at least one selected from the group consisting of simple substances, hydroxides and oxides) are dry-blended and put the blend into a hopper of an extruder, 2) a method in which the modified propylene polymer, the unmodified propylene homopolymer and the alkaline earth metal compound (at least one selected from the group consisting of simple substances, hydroxides and oxides) are dry-blended and put the blend into a hopper of an extruder, 3) a method in which the propylene homopolymer, the unsaturated carboxylic acid or anhydride thereof, the organic peroxide and the alkaline earth metal compound (at least one selected from the group consisting of simple substances, hydroxides and oxides) are dry-blended and put the blend into a hopper of an extruder where the modification is carried out at the same time, and 4) a method in which an extruder having at least two inlets for feeding materials is used and while putting thereinto a dry-blended mixture of the propylene homopolymer, the unsaturated carboxylic acid or anhydride thereof, and the organic peroxide from the first inlet for feeding to carry out the modification, the alkaline earth metal compound (at least one selected from the group consisting of simple substances, hydroxides and oxides) is put thereinto from the second inlet for feeding. The methods 1), 2) and 4) are preferred from a viewpoint of an effect for improving the rigidity, the impact resistance and the durability.

Any of publicly known methods can be employed as the impregnating method as long as they are methods in which a good impregnating property is obtained. For instance, a method can be employed in which a glass fiber bundle is brought into contact with a surface of a spreader and passed thereon while applying tension to thereby impregnate it with a molten resin (Japanese Patent Publication No. 37694/1988), and a method can be also employed in which a glass fiber bundle is passed between a pair of pins for opening fibers provided in an impregnating dice in a non-contact state to thereby impregnate it with a molten resin (International Publication WO97/19805). The latter is a preferred method because less produced are plumes in drawing at a high speed.

Similarly from a viewpoint of an effect for improving the rigidity, the impact resistance and the durability, the crystalline propylene-ethylene copolymer (B1) constituting the crystalline propylene-ethylene copolymer composition (B) according to the present invention has to be a copolymer having an MFR of 10 to 60 g/10 min comprising a propylene homopolymer part which has an isotactic pentad ratio (P value) of 96% or more, an Mw/Mn (Q value) of 6 or less and a hexane extract content of 0.8% by weight or less, and a propylene-ethylene copolymer part. The isotactic pentad ratio (P value) is preferably 97% or more. Further, a total ethylene content in the copolymer (B1) has to be less than 30% by weight. In this respect, the weight average molecular weight Mw and the number average molecular weight Mn can be determined respectively by means of GPC (gel permeation chromatography).

The production process for the copolymer described above shall not specifically be restricted, and any of publicly known processes can be employed. A process disclosed in Japanese Patent Application Laid-Open No. 269124/1996 can be given as one example thereof. That is, it is a process in which a highly stereospecific catalyst obtained from a solid catalyst component comprising a magnesium atom, a titanium atom, a halogen atom and a polyvalent carboxylic acid ester, an organic aluminum compound such as triethylaluminum, and an electron-donating compound such as t-butyltriethoxysilane is used to carry out homopolymerization of propylene as the first step, followed by the copolymerization of propylene with ethylene as the second step. The above copolymerization is carried out usually at a polymerization temperature of 20 to 80° C. and under a pressure of 5 MPa or less. In this respect, a method for feeding propylene and ethylene to a polymerization vessel shall not specifically be restricted, but the content in a copolymerization part is preferably 30 to 80% by weight. The polymerization by a slurry method is preferred in order to allow the hexane extract content to fall in the range described above.

In respect to the copolymer composition (B) according to the present invention, 0.01 to 1 part by weight of the nucleating agent (B2) per 100 parts by weight of the copolymer (B1) described above is preferably blended from a viewpoint of an effect for improving the rigidity, the impact resistance and the durability. Capable of being recited as the examples of the nucleating agent are talc, succinic acid, lithium benzoate, sodium benzoate, aluminum hydroxy-bis(4-t-butylbenzoate), 1•3,2•4-dibenzylidene-sorbitol, 1•3,2•4-bis(p-methylbenzylidene)sorbitol, 1•3,2•4-bis(p-ethylbenzylidene)sorbitol, 1•3,2•4-bis(2', -4'-dimethylbenzylidene)sorbitol, 1•3,2•4-bis(3', 4'-dimethylbenzylidene)sorbitol, 1•3-p-chlorobenzylidene-2•4-p-methylbenzylidenesorbitol, sodium-bis(4-t-butylphenyl)phosphate, sodium-2,2'-methylene-bis(4,6-di-t-butylphenyl)phosphate, a mixture (1:1:1 (weight ratio)) comprising ternary components of aluminum dihydroxy-2,2'-methylene-bis(4,6-di-t-butylphenyl)phosphate, aluminum hydroxy-bis[2,2'-methylene-bis(4,6-di-t-butylphenyl)-phosphate] and lithium stearate, poly-3-methyl-1-butene, polyvinylcyclohexane, polyallyltrimethylsilane and N,N'-dicyclohexyl-2,6-naphthalenedicarboxyamide.

The form of the above copolymer resin composition (B) shall not specifically be restricted and may be pellet, granular, flaky or powdery. A pellet obtained by mixing (B1) and (B2) then, melting and kneading the mixture is preferably used.

In the present invention, the long fiber-reinforced propylene polymer composition (A) can be blended with the crystalline propylene-ethylene copolymer composition (B) by a dry blending system. It is rather preferred to obtain a composition having an improved rigidity, impact resistance and durability that they are fed directly into a molding machine such as an injection-molding machine after dry-blending without passing through an extruder in order to maintain a length of the fibers included in the composition. The blending proportion thereof is determined depending on a glass fiber content in the long fiber-reinforced propylene polymer composition (A) and a glass fiber content required to the final molded article. It is preferably 55 to 90% by weight of (A) and 10 to 45% by weight of (B) from a viewpoint of improving the rigidity, the impact resistance and the durability.

In addition to those described above, an antioxidant, a light stabilizer, a UV absorber and an antistatic agent can be added, if necessary, to the composition of the present invention.

Publicly known molding methods such as an injection-molding method, an extrusion-molding method, a blow-molding method, a compression-molding method and an injection compression-molding method can be applied without any restrictions to a production method for a molding article obtained from the long fiber-reinforced polypropylene resin composition of the present invention. In particular, an injection-molding method, a compression-molding method and an injection compression-molding method are preferred. The resulting molded article can widely be used for various uses from small-sized to large-sized ones. Among them, it can suitably be used in uses for medium-sized to large-sized molded articles for automobiles.

EXAMPLES

The present invention shall more specifically be explained below with reference to examples and comparative examples, but the present invention shall not be restricted to the ranges of these examples.
Measuring Methods of Resin:
(1) Isotactic Pentad Ratio (P value)
Measured by means of $^{13}$C-NMR based on Macromolecules 8, 687 (1975).
(2) MFR
Measured based on a test condition 14 of JIS-K7210.
(3) Mw/Mn (Q value)
The sample was dissolved in orthodichlorobenzene of 135° C. to measure the value by means of a GPC (gel permeation chromatograph) apparatus (model 150C, manufactured by Waters Co., Ltd., column used: TSK GEL GMH6-HT).
(4) Hexane Extract Amount
Two grams of the crushed sample was set in a Soxhlet extractor and extracted with hexane for 2 hours. The extract amount was calculated from the weight of the sample before and after extract.
Evaluation Methods of Molded Article:
(1) Tensile Elastic Modulus
Measured based on JIS-K7113. A JIS No. 1 tensile dumbbell molded by a combination test piece die was used as a test piece.
(2) Punching Impact Breaking Energy
A punching impact test was carried out based on ASTM D3763. A molded article of 50 mm×50 mm×3 mm thickness molded by a combination test piece die was used to determine a breaking energy value by means of a Dynatap impact tester manufactured by General Research Co., Ltd.
(3) Flexural Fatigue Limit
A test piece of an ASTM D671B method Type 1 molded by a combination test piece die was used to carry out a flexural fatigue test on the conditions of an ambient temperature of 80° C. and 1800 cycle/min. The stress value in $10^7$ cycles was designated as the flexural fatigue limit.

Example 1

A glass roving having an average fiber diameter of 17 μm and a tex yarn number count of 2310 g/km was introduced into an impregnating bath heated at 280° C. On the other hand, fed into the above impregnating bath from an extruder was a molten mixture of a maleic anhydride-modified propylene polymer (abbreviated as [modified PP] in Table 1) having a P value of 97.3% and an MFR of 140 g/10 min and magnesium hydroxide (blended so that it accounted for 2.0% by weight in the-long fiber-reinforced propylene polymer composition). The glass roving was impregnated with a polypropylene resin and then pulled through a round nozzle having a diameter of 2.3 mm. It was cooled down and then cut to a length of 10 mm to obtain a long fiber-reinforced propylene polymer composition pellet having a glass fiber content of 50% by weight.

On the other hand, a talc having an average particle diameter of 2.5 μm was added in an amount of 0.2 part by weight per 100 parts by weight of a crystalline propylene-ethylene copolymer having a total ethylene content of 6.5% by weight and an MFR of 30 g/10 min which comprises a homopolymer part having a P value of 97.1%, a Q value of 5.4 and a hexane extract content of 0.6% by weight, and a propylene-ethylene copolymer part. They were molten and kneaded at 200° C. to prepare a crystalline propylene-ethylene copolymer composition pellet.

The long fiber-reinforced resin pellet and the copolymer composition pellet each described above were dry-blended in a proportion of 80% by weight and 20% by weight respectively so that the glass fiber content was 40% by weight in the final composition. The blend was charged into an injection-molding machine set at a cylinder temperature of 250° C. and molded into test pieces required for evaluation by means of a combination test piece die. These test pieces were used for carrying out the respective evaluations to find that all were good. The results thereof are shown in Table 1.

TABLE 1

| | | | Example | | | | Comparative Example | | |
|---|---|---|---|---|---|---|---|---|---|
| | | | 1 | 2 | 3 | 4 | 1 | 2 | 3 |
| Long fiber-reinforced pellet (A) | Modified PP (A1) | P value % | 97.3 | 96.5 | 97.2 | 97.3 | 95.0 | 97.3 | 97.3 |
| | | MFR g/10 min | 140 | 150 | 240 | 140 | 150 | 140 | 140 |
| | Alkaline earth metal content (A2) | — | 2.0 | 2.0 | 2.0 | 2.0 | 2.0 | 0 | 2.0 |
| | Glass fiber content (A3) | wt % | 50 | 50 | 50 | 50 | 50 | 50 | 50 |
| Copolymer resin composition (B) | Polymer type | — | Block | Block | Block | Block | Block | Block | Homo |
| | P value | % | 97.1 | 97.1 | 97.1 | 96.4 | 97.1 | 97.1 | 96.8 |
| | Q value | — | 5.4 | 5.4 | 5.4 | 5.1 | 5.4 | 5.4 | 7.9 |
| | Hexane extract amount | wt % | 0.6 | 0.6 | 0.6 | 0.7 | 0.6 | 0.6 | 1.2 |
| | MFR | g/10 min | 30 | 30 | 30 | 55 | 30 | 30 | 33 |
| | Nucleating agent content | wt % | 0.2 | 0.2 | 0.2 | 0.2 | 0.2 | 0.2 | 0.2 |
| Blend ratio | Long fiber-reinforced resin (A) | wt % | 80 | 80 | 80 | 80 | 80 | 80 | 80 |
| | Diluent (B) | wt % | 20 | 20 | 20 | 20 | 20 | 20 | 20 |
| Final glass fiber content | | wt % | 40 | 40 | 40 | 40 | 40 | 40 | 40 |
| Evaluation results | Tensile elastic modulus | MPa | 9280 | 9120 | 9310 | 9070 | 8180 | 7630 | 8650 |
| | Punching impact breaking energy | J | 20 | 19 | 19 | 18 | 13 | 12 | 11 |
| | Flexural fatigue limit | MPa | 39 | 38 | 37 | 37 | 25 | 24 | 27 |

| | | | Comparative Example | | | | | Example 5 |
|---|---|---|---|---|---|---|---|---|
| | | | 4 | 5 | 6 | 7 | 8 | |
| Long fiber-reinforced pellet (A) | Modified PP (A1) | P value % | 97.3 | 97.3 | 97.3 | 97.3 | 97.3 | 97.3 |
| | | MFR g/10 min | 140 | 140 | 140 | 140 | 140 | 140 |
| | Alkaline earth metal content (A2) | — | 2.0 | 2.0 | 2.0 | 2.0 | 2.0 | 2.0 |
| | Glass fiber content (A3) | wt % | 50 | 50 | 50 | 50 | 50 | 50 |
| Copolymer resin composition (B) | Polymer type | — | Block | Block | Block | Block | Block | Block |
| | P value | % | 95.0 | 95.3 | 96.9 | 97.0 | 97.1 | 97.1 |
| | Q value | — | 7.1 | 5.5 | 7.8 | 5.6 | 5.4 | 5.4 |
| | Hexane extract amount | wt % | 1.1 | 1.2 | 0.8 | 1.2 | 0.6 | 0.6 |
| | MFR | g/10 min | 29 | 26 | 26 | 29 | 30 | 30 |
| | Nucleating agent content | wt % | 0.2 | 0.2 | 0.2 | 0.2 | 0 | 0.2 |
| Blend ratio | Long fiber-reinforced resin (A) | wt % | 80 | 80 | 80 | 80 | 80 | 60 |
| | Diluent (B) | wt % | 20 | 20 | 20 | 20 | 20 | 40 |
| Final glass fiber content | | wt % | 40 | 40 | 40 | 40 | 40 | 30 |
| Evaluation results | Tensile elastic modulus | MPa | 7570 | 7820 | 8140 | 7900 | 7870 | 7190 |

TABLE 1-continued

| | | | | | | | |
|---|---|---|---|---|---|---|---|
| Punching impact breaking energy | J | 16 | 17 | 12 | 17 | 17 | 16 |
| Flexural fatigue limit | MPa | 21 | 22 | 26 | 29 | 27 | 26 |

Example 2

The same procedure as in Example 1 was repeated to produce a long fiber-reinforced polymer composition pellet, except that used was a maleic anhydride-modified propylene polymer having a P value of 96.5% and an MFR of 150 g/10 min, and it was used to carry out dry-blending, molding and evaluation to find that all of the results were good.

Example 3

The same procedure as in Example 1 was repeated to produce a long fiber-reinforced polymer composition pellet, except that used was a maleic anhydride-modified propylene polymer having a P value of 97.2% and an MFR of 240 g/10 min, and it was used to carry out dry-blending, molding and evaluation to find that all of the results were good.

Example 4

The same procedure as in Example 1 was repeated to produce a long fiber-reinforced polymer composition pellet, except that used as the crystalline propylene-ethylene copolymer composition was a copolymer resin composition pellet obtained by melting and kneading 100 parts by weight of a crystalline propylene-ethylene copolymer having a total ethylene content of 6.8% by weight and an MFR of 55 g/10 min in which a polymer in a propylene homopolymer part had a P value of 96.4%, a Q value of 5.1 and a hexane extract content of 0.7% by weight, and 0.2 part by weight of talc having an average particle diameter of 2.5/$\mu$m at 200° C., and it was subjected to carry out dry-blending, molding and evaluation to find that all of the results were good.

Comparative Example 1

The same procedure as in Example 1 was repeated to produce a long fiber-reinforced polymer composition pellet, except that used was a maleic anhydride-modified propylene polymer having a P value of 95.0% and an MFR of 150 g/10 min, and it was used to carry out dry-blending, molding and evaluation to find that the punching impact and the flexural fatigue limit were unsatisfactory because the P value fell outside the range of the present invention.

Comparative Example 2

The same procedure as in Example 1 was repeated to produce a long fiber-reinforced polymer composition pellet, except that magnesium hydroxide was not blended, and it was used to carry out dry-blending, molding and evaluation to find that all of the tensile elastic modulus, the punching impact and the flexural fatigue limit were unsatisfactory.

Comparative Example 3

Dry-blending, molding and evaluation were carried out in the same manners as in Example 1, except that a propylene homopolymer (described as [homo] in Table 1) described in Table 1 was substituted for the crystalline propylene-ethylene copolymer, but the punching impact and the flexural fatigue limit were unsatisfactory.

Comparative Examples 4 to 7

Dry-blending, molding and evaluation were carried out in the same manners as in Example 1, except that copolymers described in Table 1 were used as the crystalline propylene-ethylene copolymer, but the punching impact and the tensile elastic modulus were unsatisfactory.

Comparative Example 8

Production of a pellet, dry-blending, molding and evaluation of a copolymer composition pellet were carried out in the same manners as in Example 1, except that the it nucleating agent was not blended, but the tensile elastic modulus and the flexural fatigue limit were unsatisfactory.

Example 5

Molding and evaluation were carried out in the same manner as in Example 1, except that dry-blending was link carried out so that the glass fiber content was 30% by weight in the final composition, and all of the results were good.

Industrial Applicability

The long fiber-reinforced polypropylene resin composition of the present invention can improve all of a mechanical strength, a rigidity, an impact resistance and particularly a punching impact resistance to a large extent simultaneously due to combination of a specific long fiber-reinforced polymer composition with a specific diluent, and it is excellent as well in a durability. This makes it possible to widely use the resin composition for various uses from small-sized ones to large-sized ones. Among them, it can suitably be used for uses in medium-sized to large-sized molded articles for automobiles.

What is claimed is:

1. A long fiber-reinforced polypropylene resin composition comprising 55 to 90% by weight of a long fiber-reinforced propylene polymer composition (A) shown below and 10 to 45% by weight of a crystalline propylene-ethylene copolymer composition (B) shown below, wherein the long fiber-reinforced propylene polymer composition (A) is a composition comprising (A1), (A2) and (A3) shown below:

(A1): 20 to 64.9% by weight of a modified propylene polymer obtained by modifying a propylene homopolymer with an unsaturated carboxylic acid or an anhydride thereof, or a mixture of the above modified propylene polymer and an unmodified propylene homopolymer, wherein the isotactic pentad ratio (P value) is 96% or more, and the melt flow rate (230° C., 21.18N; hereinafter abbreviated to as [MFR]) is 100 to 500 g/10 min, (A2): 0.1 to 5% by weight of at least one member selected from the group consisting of simple substances, hydroxides and oxides of alkaline earth metals and (A3): 35 to 75% by weight of a long glass fiber having a length of 2 to 50 mm;

the crystalline propylene-ethylene copolymer composition (B) is a composition comprising (B1) and (B2) shown below:

(B1): 100 parts by weight of a crystalline propylene-ethylene copolymer having an MFR of 10 to 60 g/10 mm which comprises a propylene homopolymer part having an isotactic pentad ratio (P value) of 96% or more, a weight average molecular weight Mw/number average molecular weight Mn (Q value) of 6 or less and a hexane extract content of 0.8 weight % or less, and a propylene-ethylene copolymer part and (B2): 0.01 to 1 part by weight of a nucleating agent.

2. The long fiber-reinforced polypropylene resin composition as described in claim 1, wherein the modified propylene polymer or the mixture of the above modified propylene polymer and the unmodified propylene homopolymer (A1) has an MFR of 100 g/10 min or more and less than 300 g/10 min.

3. The long fiber-reinforced polypropylene resin composition as described in claim 1, wherein the propylene homopolymer part contained in the crystalline propylene-ethylene copolymer (B1) has an isotactic pentad ratio (P value) of 97% or more.

4. The long fiber-reinforced polypropylene resin composition as described in claim 1, wherein the long fiber-reinforced propylene polymer composition (A) is a pellet produced by a melt-pulltrusion method.

5. The long fiber-reinforced polypropylene resin composition as described in claim 1, wherein the unsaturated carboxylic acid or anhydride thereof is maleic anhydride.

6. The long fiber-reinforced polypropylene resin composition as described in claim 1, wherein the at least one member selected from the group consisting of simple substances, hydroxides and oxides of alkaline earth metals (A2) is magnesium hydroxide.

7. A long fiber-reinforced polypropylene resin composition comprising
the following (A1), (B1), (A2), (B2) and (A3);

(A1): 11.0 to 58.41% by weight of a modified propylene polymer obtained by modifying a propylene homopolymer with an unsaturated carboxylic acid or an anhydride thereof, or a mixture of the above modified propylene polymer and an unmodified propylene homopolymer, wherein the isotactic pentad ratio (P value) is 96% or more, and the melt flow rate (230° C., 21.18N; hereinafter abbreviated as [MFR]) is 100 to 500 g/10 min, (B1): 9.901 to 44.996% by weight of a crystalline propylene-ethylene copolymer having an MIFR of 10 to 60 g/10 min comprising a propylene homopolymer part which is a polymer having an isotactic pentad ratio (P value) of 96% or more, a weight average molecular weight Mw/number average molecular weight Mn (Q value) of 6 or less and a hexane extract content of 0.8% by weight or less, and a propylene-ethylene copolymer part, (A2): 0.055 to 4.5% by weight of at least one member selected from the group consisting of simple substances, hydroxides and oxides of alkaline earth metals, (B2): 0.001 to 0.45 part by weight of a nucleating agent and (A3): 19.25 to 67.5% by weight of a long glass fiber having a length of 2 to 50 min,
wherein (A3) described above is impregnated in advance with (A1) described above.

* * * * *